July 24, 1956

E. LICHTENFELD 2,756,297

CURRENT COLLECTOR FOR RELATIVELY MOVABLE PARTS,
PARTICULARLY FOR AUTOMOTIVE TIRE CONTROL

Filed Feb. 21, 1952

INVENTOR
ENGELHARD LICHTENFELD

BY
ATTORNEY

United States Patent Office 2,756,297
Patented July 24, 1956

2,756,297

CURRENT COLLECTOR FOR RELATIVELY MOVABLE PARTS, PARTICULARLY FOR AUTOMOTIVE TIRE CONTROL

Engelhard Lichtenfeld, Hamburg, Germany

Application February 21, 1952, Serial No. 272,858

Claims priority, application Germany April 19, 1951

7 Claims. (Cl. 200—61.22)

The present invention relates to a current collector for relatively movable parts, particularly for use in connection with automotive vehicles having electrical means for automatically indicating the degrees of inflation of the tires of the vehicle.

Means to test the air pressure in a tire with the aid of contact fingers or the like have been known for some time; in addition thereto there have been proposed electrical devices, coming more and more into use, adapted to give a visual or audible signal indication at the dash board of the driver directly under the control of the pressure obtaining within the inflated tube. Devices of this latter description, as is well known, have the advantage of giving an alarm instantaneously upon a drop in pressure and not after an interval liable to cause irreparable damage to the tire.

Hitherto the operational safety of such devices has been impaired mainly by the fact that the transmission of currents from the moving wheel to the vehicle was highly susceptible to interferences. Thus the conventionally used carbon brush collectors are quite unsuitable for this purpose. Apart from such carbon brushes, however, attempts have been made to use bronze or copper brushes sliding along the associated slip rings of the rolling wheel. These brushes, however, have likewise failed to give satisfactory performances, one reason being that the parts are greatly exposed to dirt and moisture as a result of which at least in the absence of continuous inspection and cleaning, adequate contact is not always assured. In order to insure at least some continuity of contact, it was necessary to use a high brush pressure, this in turn leading to considerable wear. It has also been proposed to dispose the current collector inside the brake drum, in order to protect the contact members from the effects of weather and dust; this arrangement, however, is conductive to failure due to contamination by oil or by a metal-laden dust, such as is created during the braking action. Moreover, an arrangement of this description has the disadvantage that the parts are almost inaccessible and that their mounting requires large amounts of material and labor, this being particularly annoying in view of the fact that the tracing of troubles and the readjustment of the brushes can likewise be effected only by a demounting of the brake drum.

The principal object of the present invention is to provide means for the transmission of current from the moving wheel to the vehicle which will avoid the disadvantages referred to.

More particularly, it is an object of this invention to provide a current collector for the purposes set forth adapted to operate dependably even after having been used for thousands of miles.

Another object of the invention is to provide a collector of this character which is simple in construction, whose individual parts are easy to assemble and which may be mounted, readjusted or demounted without removal of the wheels, hubs or brake drums.

Still another object of the invention is to provide a collector having the advantages set forth above which at the same time is substantially shockproof, robustly designed to withstand the wear and tear of driving in traffic, and resistant to the influences of the weather and other chemical attack.

In accordance with the invention there is provided a collector secured in easily accessible position to the wheel or its mounting and consisting of a contact strip insulatedly mounted, for example, on the wheel or on the brake drum, in combination with a collector brush held, say, in relatively stationary position on the wheel bracket (or vice versa, with the brush movable and the contact strip stationary), the brush consisting of metallic contact bristles of bronze, copper or the like together with non-conductive reinforcing bristles such as, for example, natural hair.

The two contact elements, the stationary one as well as the one rotating with the wheel, are arranged on the outside, the stationary elements on a part like the stationary portion of the brake drum and the movable element either on the wheel or on the brake drum. The contact elements are thus freely accessible from the outside, but protected against mechanical shocks and atmospheric conditions by the projecting rim of the wheel. The contact equipment is therefore suitably disposed on the side of the wheel facing the vehicle, though it remains easily accessible, and its attachment, control and repair do not require dismounting of the wheel and brake drum as do the known construction of this class.

The simultaneous provision of metal bristles and non-conductive reinforcing bristles, apart from providing an elastic support for the contact bristles preventing them from bending over or buckling, also affords continuous and automatic cleaning of the contact strip as well as of the contact bristles themselves. The contact brush may be mounted in a very simple manner on a stationary part of the brake assembly, such as the brake anchor plate, or on some other relatively immovable part associated with the wheel bracket. The body of the brush may be insulatedly mounted in a supporting arm of suitable configuration to form a shield adapted to keep coarser dirt particles or loose objects away from the contact elements.

According to the invention, the contact strip is preferably designed as a ring segment. This has the advantages of simplified mounting and reduced expenditure of material, coupled with lessened wear of the brush since the contact path extends only over a fraction of a circle. By this means there is also provided, during each revolution of the parts, a cooling effect counteracting the generation of undesirable frictional heat which could give rise to objectionable chemical reactions; also the blinking of the signal lamp caused by intermittent contact between the brush and the segmental contact strip will attract the driver's attention better than a steady light.

The invention will be described in detail with reference to the accompanying drawing showing, by way of illustration and not limitation, a representative embodiment thereof. In the drawing.

Figure 1:
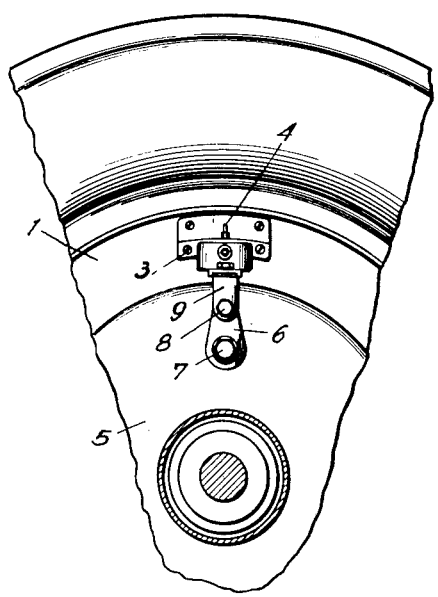
Fig. 1 shows in elevation a sector of a wheel carrying a collector according to the invention.
Figure 2:
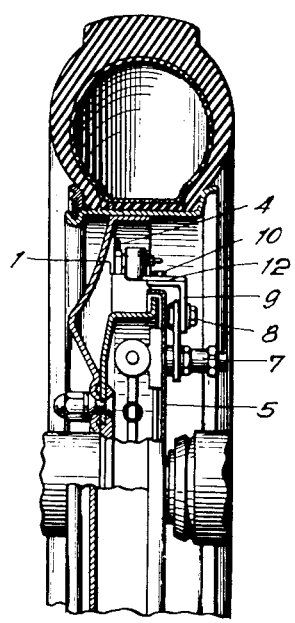
Fig. 2 is an axial section through the wheel sector of Fig. 1.

The drawing shows at 1 the felly of an automobile wheel to which is secured, through an insulating spacer 2, the segmental contact strip 3, a terminal screw 4 thereon being connectable to a wire leading to a conventional pressure-sensitive control device (not shown) within the tire or its valve. The contact strip 3 is formed to conform to the curvature of the rim portion supporting it, its length being such as to extend over only a small fraction of a circle.

Fixed to the relatively stationary brake member 5 outside the brake drum is the brush support, consisting of a strip 6 having an eye through which passes a mounting screw 7. Secured to this arm, by means of a connecting screw 8, is a bracket 9 whose horizontal leg carries a screw 10 passing through a slot 11 therein, this screw serving for adjustably securing to the bracket the supporting arm 12. Rising vertically from this arm is a brush guide 13 having an abutment 14, the brush holder 15 being inserted in said guide so as to be readily replaceable therein. This brush holder contains alongside one another a set of metal bristles 16 and a set of hair bristles 17; in the particular embodiment illustrated a ring of hair bristles 17 surrounds the metal bristles 16, it being, of course, understood that the two kinds of bristles may be interspersed uniformly or arranged in alternating tufts. The brush 16, 17 is surrounded by a protective strip 18 barring access to dirt and other objects. The metal brushes 16 are electrically connected to terminal screw 19 which also maintains the brush holder 15 in place and which insulatedly passes through the strip 18. A control circuit, not shown, extends in a manner known per se over the indicator to battery and thence back to the control device via the chassis.

The contact strip 3 engages the brush 16, 17 once during each revolution of the wheel, it being immaterial for purposes of the invention whether the brush strikes the strip broadside or with its leading edge. Preferably the spacer 2 and the strip 3 form ramps 20 to afford smooth and shock-free engagement of the parts.

Figure 3:
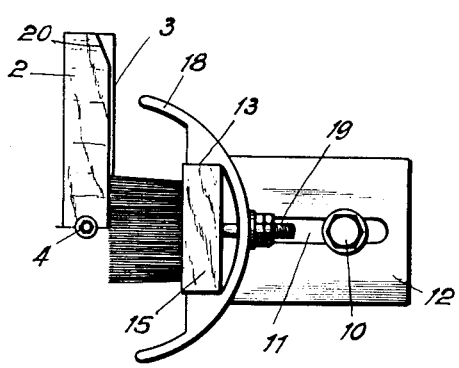
Fig. 3 is a top plan view, on an enlarged scale, of the collector shown in Figs. 1 and 2.
Figure 4:
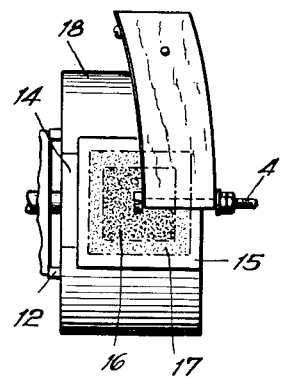
Fig. 4 is an end view of the collector (parts broken off) shown in Fig. 3.

At the same time, as clearly seen in Fig. 3, the tips of the bristles 16, 17 terminating about flush with spacer 2 extend well beyond the plane of rotation of a projecting edge of contact member 3, whereby some of the metal bristles 16 will be deflected while others will remain undeflected (see Fig. 4) and will engage this projecting edge over a substantial portion of their length.

When the pressure in the tire drops below a predetermined limit, the pressure-sensitive control device referred to above responds and connects the indicator in series with battery across terminal screws 4 and 19. Once during each rotation of wheel 1 the alarm circuit is completed by contact between strip 3 and bristles 16. The indicator is thus actuated periodically to give an intermittent flashing, ringing or similar signal.

It will, of course, be obvious that the invention may also be realized by an arrangement equivalent to that shown in the drawing but having the brush attached to the rotating part 1 and the contact strip mounted on the relatively stationary part 5, the operation being the same in both cases.

The mounting described enables the device to be attached to any vehicle in the simplest possible manner, since all parts are easily accessible for adjustment. In particular it will be convenient to readjust the brush with the aid of the screw 10 and the slot 11.

While the invention has been described with reference to a certain embodiment only, it should be understood that the same may be modified in many respects and the invention adapted to different uses without thereby departing from the scope of the appended claims.

I claim:
1. A current collector for a device having a rotating member and a stationary member including a brake drum adjacent said rotating member, said collector comprising an arcuate segment located externally of the brake drum on one of said members and a brush located externally of the brake drum on the other of said members, said brush comprising in combination a set of conductive bristles susceptible to buckling and a set of non-conductive reinforcing bristles closely juxtaposed with said conductive bristles.

2. A current collector according to claim 1, wherein said brush comprises in combination a set of metal bristles and a set of bristles of natural hair.

3. A current collector according to claim 1, wherein said brush is mounted on the outside of said brake drum, said brush having a holder provided with adjusting means including a double screw assembly, said segment being electrically insulated and secured to said rotating member.

4. A current collector for a vehicle having a wheel and a stationary member including a brake drum adjacent said wheel, said collector comprising a pair of contact elements located externally of said brake drum on said wheel and on said stationary member, respectively, one of said contact elements comprising a brush consisting of metal bristles susceptible to buckling and natural bristles closely juxtaposed with said metal bristles, a brush holder for said brush and a protective strip surrounding said brush holder, said protective strip being recessed in conformity with said brush holder and being provided with a retaining screw engaging said brush holder, said screw being electrically connected to said metal bristles while being electrically insulated from said protective strip, and means for supplying electric current to said metal bristles by way of said screw.

5. A current collector according to claim 1, wherein said reinforcing bristles surround said conductive bristles.

6. A current collector for a device having a rotating member and a stationary member including a brake drum adjacent said rotating member, said collector comprising an arcuate segment located externally of the brake drum on one of said members and a brush located externally of the brake drum on the other of said members, said brush comprising a set of conductive bristles, said segment having a projecting edge overlappingly positioned with respect to some of said bristles so as to deflect the latter and to make contact with adjacent bristles over a substantial portion of their length.

7. A current collector according to claim 6, wherein said conductive bristles are susceptible to buckling, said brush further including a set of reinforcing bristles of non-conductive material closely surrounding said conductive bristles.

References Cited in the file of this patent

UNITED STATES PATENTS

| | | |
|---|---|---|
| 885,121 | Winter | Apr. 21, 1908 |
| 1,781,551 | Mataya | Nov. 11, 1930 |
| 2,199,032 | Stoddard | Apr. 30, 1940 |
| 2,239,676 | Henry | Apr. 29, 1941 |
| 2,269,614 | Von Soden | Jan. 13, 1942 |
| 2,331,571 | Risser | Oct. 12, 1943 |
| 2,482,984 | Lana et al. | Sept. 27, 1949 |
| 2,486,042 | Lesigne | Oct. 25, 1949 |
| 2,521,887 | Wihanto | Sept. 12, 1950 |